(12) United States Patent
Lee

(10) Patent No.: US 6,487,422 B1
(45) Date of Patent: Nov. 26, 2002

(54) WIRELESS TELEPHONE HAVING REMOTE CONTROLLER FUNCTION

(76) Inventor: Chul Woo Lee, 68-555 Jangwi 2-Dong, Sungbuk-Gu, Seoul (KR)

(*) Notice: Subject to any disclaimer, the term of this patent is extended or adjusted under 35 U.S.C. 154(b) by 0 days.

(21) Appl. No.: 09/579,895

(22) Filed: May 26, 2000

(30) Foreign Application Priority Data

Oct. 12, 1999 (KR) .............................................. 99-43983

(51) Int. Cl.$^7$ ................................................. H04B 1/16
(52) U.S. Cl. ........................ 455/550; 455/92; 455/566; 455/575
(58) Field of Search ................................ 455/550, 575, 455/566, 567, 569, 556, 92, 66

(56) References Cited

U.S. PATENT DOCUMENTS

| | | | | |
|---|---|---|---|---|
| 5,802,460 A | * | 9/1998 | Parvulescu et al. | ......... 455/419 |
| 5,901,366 A | * | 5/1999 | Nakano et al. | ............. 348/565 |
| 5,920,806 A | * | 7/1999 | Gouessant | .................. 348/552 |
| 6,243,594 B1 | * | 6/2001 | Silberfenig | .................. 379/85 |
| 6,397,086 B1 | * | 5/2002 | Chen | ........................... 455/556 |

* cited by examiner

Primary Examiner—Thanh Cong Le
Assistant Examiner—Tan Trinh
(74) Attorney, Agent, or Firm—Birch, Stewart, Kolasch & Birch, LLP

(57) ABSTRACT

A wireless telephone having a remote controller function, including a key input unit for inputting television control key signals for television viewing or incoming call termination or a telephone number for outgoing call origination, a television controller for controlling the overall system of a television in response to the key signals inputted by the key input unit, an indicator responsive to a first control signal from the television controller for indicating an incoming call termination state or a recorded state of a telephone message received in the user's absence, a display unit responsive to a second control signal from the television controller for displaying information about the incoming call termination state on a screen of the television, and a recording/reproduction unit responsive to a third control signal from the television controller for recording or reproducing the telephone message received in the user's absence. The wireless telephone is capable of functioning as a remote controller for the television and the like using its buttons to control television viewing and a telephone conversation at the same time. Further, even hearing impaired people can recognize the incoming call termination state by viewing the associated information displayed on the television screen by the display unit.

3 Claims, 1 Drawing Sheet

(FIG.1)
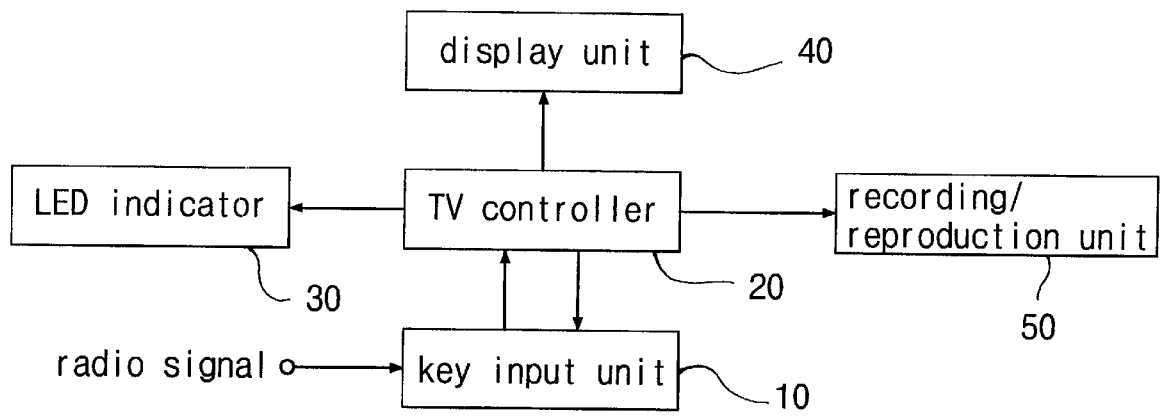
(FIG. 2)
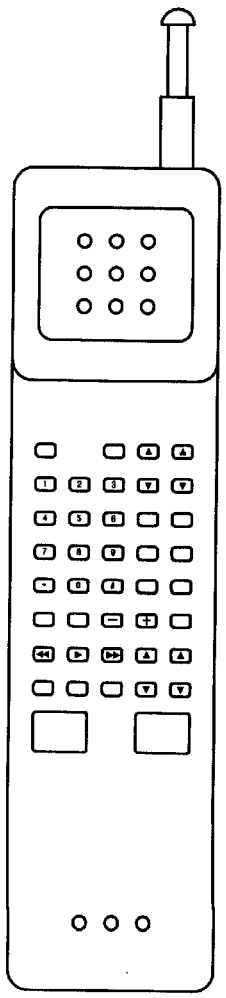

WIRELESS TELEPHONE HAVING REMOTE CONTROLLER FUNCTION

BACKGROUND OF THE INVENTION

1. Field of the Invention

The present invention relates in general to a wireless telephone having a remote controller function, and more particularly to such a wireless telephone which is capable of functioning as a remote controller for a television (TV) and the like using its buttons to control TV viewing and a telephone conversation at the same time and displaying information about an incoming call termination state on a screen of the TV to allow even hearing impaired people to recognize the incoming call termination state.

2. Description of the Prior Art

Generally, a TV viewer selects a desired TV channel using a remote controller to view a desired TV program.

When a telephone rings while viewing the TV, the viewer lowers a volume of the TV using the remote controller or selects a mute function using it to mute the TV volume, and then receives a telephone call.

For this reason, in the case where the telephone rings during the TV viewing, a considerable amount of delay time is required in searching for the remote controller and adjusting the TV volume. As a result, the telephone may often stop ringing before the viewer receives the telephone call.

Further, the viewer may often not hear the ringing of the telephone if he views the TV at a loud volume.

SUMMARY OF THE INVENTION

Therefore, the present invention has been made in view of the above problems, and it is an object of the present invention to provide a wireless telephone having a remote controller function, which is capable of functioning as a remote controller for a TV and the like using its buttons to control TV viewing and a telephone conversation at the same time and displaying information about an incoming call termination state on a screen of the TV to allow even hearing impaired people to recognize the incoming call termination state.

In accordance with the present invention, the above and other objects can be accomplished by a provision of a wireless telephone having a remote controller function, comprising key input means for inputting television control key signals for television viewing or incoming call termination or a telephone number for outgoing call origination; television control means for controlling the overall system of a television in response to the key signals inputted by the key input means; indication means responsive to a first control signal from the television control means for indicating an incoming call termination state or a recorded state of a telephone message received in the user's absence; display means responsive to a second control signal from the television control means for displaying information about the incoming call termination state on a screen of the television; and recording/reproduction means responsive to a third control signal from the television control means for recording or reproducing the telephone message received in the user's absence.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a wireless telephone having a remote controller function in accordance with the present invention; and FIG. 2 is a view showing the appearance of an embodiment of the wireless telephone in accordance with the present invention.

DETAILED DESCRIPTION OF THE PREFERRED EMBODIMENTS

With reference to FIG. 1, there is shown in block form the construction of a wireless telephone having a remote controller function in accordance with the present invention. As shown in this drawing, the wireless telephone comprises a key input unit 10 for inputting TV control key signals for TV viewing or incoming call termination or a telephone number for outgoing call origination. A TV controller 20 is adapted to control the overall system of a TV in response to the key signals inputted by the key input unit 10. A light emitting diode (LED) indicator 30 is operated under control of the TV controller 20 to indicate an incoming call termination state or a recorded state of a telephone message received in the user's absence. A display unit 40 is also operated under the control of the TV controller 20 to display information about the incoming call termination state on a screen of the TV. A recording/reproduction unit 50 is also operated under the control of the TV controller 20 to record or reproduce the telephone message received in the user's absence.

Now, a detailed description will be given of the operation of the wireless telephone with the above-mentioned construction in accordance with the present invention.

When the telephone rings while the user views the TV, a radio signal is received by the key input unit 10 and applied to the TV controller 20, which then outputs a control signal to the display unit 40 at the same time as outputting another control signal to the LED indicator 30.

In response to the corresponding control signal from the TV controller 20, the LED indicator 30 turns an LED on to indicate an incoming call termination state. Further, in response to the corresponding control signal from the TV controller 20, the display unit 40 displays information about the incoming call termination state on the screen of the TV.

At this time, the user can view the turned-on state of the LED by the LED indicator 30 and the information about the incoming call termination state displayed on the TV screen by the display unit 40 as well as listen to the ringing of the wireless telephone. As a result, the user can recognize the incoming call termination state and then receive a telephone call.

In particular, even hearing impaired people can recognize the incoming call termination state by viewing the turned-on state of the LED by the LED indicator 30 and the information about the incoming call termination state displayed on the TV screen by the display unit 40.

On the other hand, a loud volume of the TV may disturb the user's telephone conversation while the user talks over the wireless telephone. In this case, the user can push a desired function selection key on the key input unit 10 to select a function of reducing or muting the TV volume. If the desired function selection key is pushed by the user, a corresponding key signal is applied to the TV controller 20, which then performs the associated function. As a result, the user can make the telephone conversation over the wireless telephone with the TV volume being reduced or muted.

In the case where the user wishes to make a telephone call to a desired party while viewing the TV, he can reduce or mute the TV volume using the desired function selection key on the key input unit 10. Accordingly, the user can make the telephone call to the desired party with the TV volume being reduced or muted.

In the case where several persons want to together listen to a voice from the desired party when making or receiving the telephone call to/from that party, they can push a corresponding function selection key on the key input unit 10 to apply an associated control signal to the TV controller 20. In response to such a control signal from the key input unit 10, the TV controller 20 controls the TV system in such a manner that all the persons can converse with the desired party over the wireless telephone while listening to the voice from that party through the TV body.

On the other hand, when a telephone message is received in the user's absence, a radio signal is received by the key input unit 10 and applied to the TV controller 20, which then outputs associated control signals to the LED indicator 30 and recording/reproduction unit 50, respectively.

In response to the corresponding control signal from the TV controller 20, the recording/reproduction unit 50 records the received telephone message and displays information about the recorded state of the received telephone message on the TV screen through the display unit 40. Further, in response to the corresponding control signal from the TV controller 20, the LED indicator 30 turns another LED on to indicate that the telephone message received in the user's absence was recorded.

After the user returns home from an outing under the condition that the telephone message received in his absence was recorded, he can view the turned-on state of the LED by the LED indicator 30 and the information about the recorded state of the received telephone message displayed on the TV screen by the display unit 40 upon powering on the TV. As a result, the user can recognize that the telephone message received in his absence was recorded and then apply a control signal to the TV controller 20 using a corresponding function selection key on the key input unit 10.

Upon receiving the control signal from the key input unit 10, the TV controller 20 controls the recording/reproduction unit 50 to reproduce the recorded telephone message.

Hence, the user can confirm the telephone message received in his absence.

As apparent from the above description, the present invention provides a wireless telephone having a remote controller function, which is capable of functioning as a remote controller for a TV and the like using its buttons to control TV viewing and a telephone conversation at the same time. Therefore, when the telephone rings during the TV viewing, there is little delay time required in searching for the remote controller and adjusting a volume of the TV. This can solve a conventional problem that the telephone may often stop ringing before the user receives a telephone call.

Further, the present wireless telephone is able to display information about an incoming call termination state on a screen of the TV, thereby allowing even hearing impaired people to recognize the incoming call termination state. Moreover, even in the case where the viewer cannot hear the ringing of the telephone because he views the TV at a loud volume, he can recognize the incoming call termination state by viewing the associated information displayed on the TV screen. This has the effect of preventing the user from being incapable of receiving a telephone call because he cannot hear the ringing of the telephone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless telephone having a remote controller function, comprising:

key input means for inputting television control key signals for television viewing or incoming call termination or a telephone number for outgoing call origination;

television control means for controlling the overall system of a television in response to said key signals inputted by said key input means;

indication means responsive to a first control signal from said television control means for indicating an incoming call termination state or a recorded state of a telephone message received in the user's absence;

display means responsive to a second control signal from said television control means for displaying information about said incoming call termination state on a screen of the television; and recording/reproduction means responsive to a third control signal from said television control means for recording or reproducing said telephone message received in the user's absence.

2. The wireless telephone as set forth in claim 1, wherein said key input means includes a combination of a keypad of a general wireless telephone and a keypad of a general remote controller.

3. The wireless telephone as set forth in claim 1, wherein said indication means includes:

a first light emitting diode turned on in response to the occurrence of said incoming call termination for indicating said incoming call termination state in such a manner that said incoming call termination state can be recognized by hearing impaired people or the user when being incapable of hearing the ringing of the telephone due to ambient noise; and a second light emitting diode turned on for indicating that said telephone message received in the user's absence was recorded.

\* \* \* \* \*